US008966645B2

(12) United States Patent
Low

(10) Patent No.: US 8,966,645 B2
(45) Date of Patent: Feb. 24, 2015

(54) PREVENTION OF ACCIDENTAL PASSWORD DISCLOSURE IN APPLICATION WINDOWS

(71) Applicant: International Business Machines Corporation, Armonk, NY (US)

(72) Inventor: Andrew R. Low, Stittsville (CA)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/686,468

(22) Filed: Nov. 27, 2012

(65) Prior Publication Data

US 2014/0150108 A1 May 29, 2014

(51) Int. Cl.
G06F 21/10 (2013.01)
G06F 21/60 (2013.01)

(52) U.S. Cl.
CPC ...................................... G06F 21/60 (2013.01)
USPC .......................................................... 726/26

(58) Field of Classification Search
CPC ................................ G06F 21/60; G06F 11/30
USPC ............................................ 726/26; 713/201
See application file for complete search history.

(56) References Cited

U.S. PATENT DOCUMENTS

| 6,374,145 | B1 * | 4/2002 | Lignoul .......................... 700/17 |
| 7,278,114 | B2 * | 10/2007 | Lapidous ....................... 715/808 |
| 7,770,133 | B2 | 8/2010 | Karstens |
| 7,865,839 | B2 | 1/2011 | Heikes et al. |
| 8,621,345 | B2 * | 12/2013 | Selby .............................. 715/271 |
| 2002/0113810 | A1 * | 8/2002 | Radtke et al. .................. 345/710 |
| 2004/0128552 | A1 * | 7/2004 | Toomey .......................... 713/201 |
| 2009/0094551 | A1 | 4/2009 | Alkov et al. |
| 2009/0100184 | A1 | 4/2009 | Chakra et al. |
| 2009/0228557 | A1 | 9/2009 | Ganz et al. |
| 2010/0023888 | A1 | 1/2010 | Song |

OTHER PUBLICATIONS

IBM, Method for Preventing Password Field From Losing Focus, Disclosure IPCOM000182606D, May 4, 2009, pp. 1-4, IP.com, Published online at: http://ip.com/IPCOM/000182606.

IBM, Method and mechanism for preventing information leakage: password input field detection and protection, Disclosure IPCOM000177685D, Dec. 25, 2008, pp. 1-4, IP.com, Published online at: http://ip.com/IPCOM/000177685.

(Continued)

Primary Examiner — Teshome Hailu
Assistant Examiner — Thanh Le
(74) Attorney, Agent, or Firm — Lee Law, PLLC; Christopher B. Lee

(57) ABSTRACT

Text entry context information associated with text entry within an inter-user communication application is evaluated. A determination is made as to whether the evaluated text entry context information identifies a text string entered by a user as a potential password inadvertently entered into the inter-user communication application by the user. In response to determining that the text string is identified as the potential password, the user is prompted to confirm that the user intends to send the text string using the inter-user communication application. The text string is transmitted using the inter-user communication application in response to a confirmation from the user to send the text string.

20 Claims, 5 Drawing Sheets

(56) References Cited

OTHER PUBLICATIONS

IBM, Method for delaying transfer of focus to a new window, Disclosure IPCOM000178037D, Jan. 14, 2009, pp. 1-2, IP.com, Published online at: http://ip.com/IPCOM/000178037.

Chris Carey, passfail.pl—Prevent password entry in IRSSI, Webpage/blog, Aug. 3, 2010, pp. 1-6, Chris Carey (Publisher), Published online at: http://chriscarey.com/wordpress/2010/08/03/passfail-pl-prevent-password-entry-in-irssi/.

\* cited by examiner

PREVENTION OF ACCIDENTAL PASSWORD DISCLOSURE IN APPLICATION WINDOWS

BACKGROUND

The present invention relates to password protection. More particularly, the present invention relates to prevention of accidental password disclosure in application windows.

Passwords are typically strings of characters, such as letters, numbers, and non-alphanumeric special characters. Users enter their passwords as part of login sequences, such as to login to user accounts and systems. When the user enters the proper password, access is granted. Improper password entry prevents access to the user accounts and systems.

BRIEF SUMMARY

A method includes evaluating, via a processor, text entry context information associated with text entry within an inter-user communication application; determining that the evaluated text entry context information identifies a text string entered by a user as a potential password inadvertently entered into the inter-user communication application by the user; prompting, in response to determining that the text string is identified as the potential password, the user to confirm that the user intends to send the text string using the inter-user communication application; and transmitting the text string via the inter-user communication application in response to a confirmation from the user to send the text string.

A system includes a communication module and a processor programmed to: evaluate text entry context information associated with text entry within an inter-user communication application; determine that the evaluated text entry context information identifies a text string entered by a user as a potential password inadvertently entered into the inter-user communication application by the user; prompt, in response to determining that the text string is identified as the potential password, the user to confirm that the user intends to send the text string using the inter-user communication application; and transmit the text string via the inter-user communication application using the communication module in response to a confirmation from the user to send the text string.

A computer program product includes a computer readable storage medium having computer readable program code embodied therewith, where the computer readable program code when executed on a computer causes the computer to: evaluate text entry context information associated with text entry within an inter-user communication application; determine that the evaluated text entry context information identifies a text string entered by a user as a potential password inadvertently entered into the inter-user communication application by the user; prompt, in response to determining that the text string is identified as the potential password, the user to confirm that the user intends to send the text string using the inter-user communication application; and transmit the text string via the inter-user communication application in response to a confirmation from the user to send the text string.

DETAILED DESCRIPTION

Figure 1:
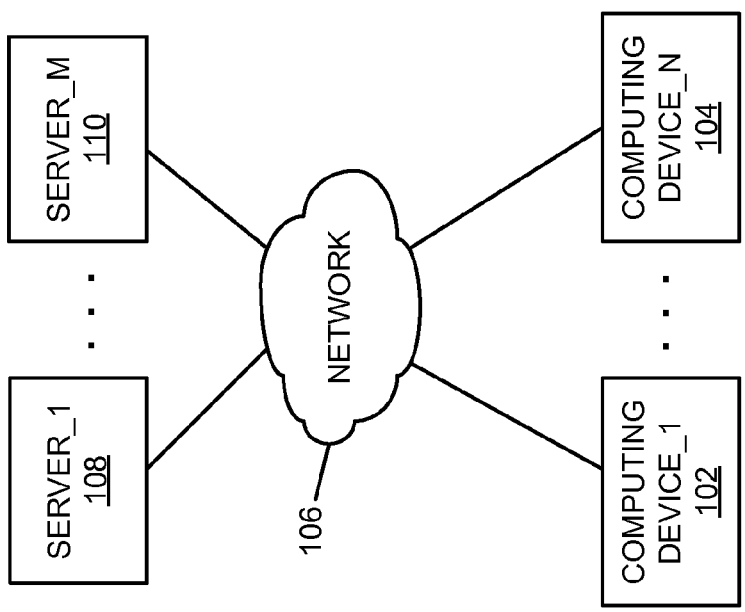
FIG. 1 is a block diagram of an example of an implementation of a system for prevention of accidental password disclosure in application windows according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides for prevention of accidental password disclosure in application windows. The present technology evaluates text entry context information in association with text entry within an inter-user communication application window, such as a chat application window, that would distribute/transmit the password to an unintended entity. The evaluated text entry context information may include run-time text-based and time-based evaluation of text entry to determine whether the user has entered a potential password, as described in more detail below. In response to identification of a possible password entered by a user, a prompt/warning may be generated to alert the user. The user may override the warning and continue with transmission of the text, regardless of whether the text is or is not a password. The user may also enable/disable the present functionality in association with a computing device, a particular application, or other processing granularity to allow flexible user-configurability of the computing technology described herein.

Regarding text-based evaluation of text entry context information, one or more of run-time spell checking, password creation rule text entry evaluation, detection of multi-line/multi-word text entry, and other text-based analytical techniques may be used to process text entry to identify a potential password entry. Regarding time-based evaluation of text entry context information, time frames associated with text entry, typing cadence, single versus multi-word/multi-line consecutive text entry within a configured time frame, detection of a windowing system/environment focus change during typing or in association with detection of a user being away from a computing device for a configured time frame, detection of muscle reflex actions (e.g., single text string followed immediately with an "enter" key), or other time-based analytical techniques may be used to process text entry to identify potential password entry.

As such, the present technology improves password protection, while allowing users flexibility to control distribution of their passwords. It should be noted that no prior configuration of established lists of passwords is required and no focus change limitation controls for systems is required to prevent accidental password disclosure in application windows, such as chat windows, using the present technology.

The present technology may be applied to any application text entry field. The present technology may further be configured to detect text fields other than valid password entry fields and to detect focus changes from valid password fields, as appropriate for a given implementation. The examples described herein utilize a chat window as an example of an inter-user communication application. When utilizing multiple applications on a computing device desktop, muscle memory associated with typing a password (e.g., hitting a transmission instruction key such as an "enter" key) may result in inadvertent transmission of a password. For example, where focus of a windowing system has changed from a valid password entry field to another text entry field, such as a text entry pane associated with a chat application, inadvertent transmission of a password may result from muscle memory password entry.

While the present examples utilize chat windows/applications for ease of description purposes, it should be understood that the present technology may be applied to any text entry field or application, as appropriate for a given implementation. For example, the present technology may be applied to a user attempting to unlock a portable telephone or other handheld device, where the device is not actually locked. In such a situation, entry of the unlock password may be inadvertently entered into a chat application text entry pane or a text message window by the user. The present technology may also be applied to situations such as this example and other situations to prevent the password from being distributed inadvertently by the user. Many other possible applications of the present technology exist, and all such applications are considered to be within the scope of the present technology.

For purposes of the present description, "focus" is considered to be a windowing system-level determination usable to identify which one of multiple applications or multiple text fields of a single application is to receive text entered by a user for subsequent processing. A "focus change" is considered a windowing system-level indication of a change of focus for purposes of text entry from one application/field to another application/field. The present technology may be applied at an application level, such as within a chat client application, or at an operating system level to manage multiple applications.

Because password requirements are defined by a security system and often prevent the use of dictionary words, the present technology may analyze during run time entered text words/phrases to detect passwords, while allowing normal chat text to be passed through without further evaluation. For example, if the entered text passes a spell check, it may be omitted from further evaluation because the spell check will identify dictionary words. However, if a spell check fails, an alert may be generated to request confirmation from the user prior to sending the entered text to prevent inadvertent password transmission via, for example, a chat window. A spell-check dictionary used for spell-check tests may be augmented over time to include chat jargon used by the user (e.g., "l8r" used for "later") to prevent false positive alerts for frequently-used jargon and terms.

The present technology further facilitates use of system password criteria/requirements to filter and analyze entered text to identify possible passwords that are entered into chat windows by users. For example, a password test may be performed by evaluating a text entry using one or more password creation rules that specify password creation requirements. Such processing may be utilized in conjunction with or instead of a spell check. Using this implementation, if a single-word entry word does not meet the password requirements set by the system, further analysis may be omitted. However, if a single-word entry satisfies the password requirements set by the system, then the single-word entry may be a possible password, and the user may be alerted to prevent inadvertent password transmission via, for example, a chat window.

As another variation, a confirmation may be changed to include a time delay, after which time it may be assumed that the user has confirmed the send. Time may further be used to prevent inadvertent password distribution in chat windows by determining whether non-dictionary single words are entered within a defined time window relative to previously-entered text that forms a text string. In such an implementation, a determination may be made as to whether the user is actively interacting with the chat window and further evaluation of non-dictionary words that are embedded within multi-word text phrases entered within a configured time frame into the chat window may be omitted. Such an implementation may be used to avoid alerting the user in such detected situations. For example, use of a configured "time since last entry" time threshold may be used to determine, where a chat window has been idle for a configured amount of time (e.g., thirty (30) seconds or more), that an unexpected text entry of a text string may be the result of a user returning from a coffee break or other out-of-office event. Further, a configured "window focus recently acquired" time threshold may be utilized, where, if a window has very recently been given focus (e.g., last two (2) seconds), then it is possible that a password text entry is in error.

Additional analytical techniques may be applied to allow non-dictionary words to be sent in chat windows without blocking them to improve run-time efficiency of password protection. For example, multi-word text and multi-line text may be identified and may be omitted from analysis because passwords generally have text string length limitations that prevent multi-line passwords.

A "context of use" of a computing device may also be analyzed to determine whether a password has been entered into a non-password text entry field. For example, utilizing time between text entry fields in conjunction with detection of a focus change on the computing device, a determination may be made as to whether an actual context of use of the computing environment (e.g., currently-focused application) is different from a context of use that is apparent to the user (e.g., a window the user thinks has focus). Within such a situation, where a determination is made that a context of use of a computing environment may be different from the context of use that is apparent to the user, the present technology may be auto-enabled to process text entry. As such, the situational context of use of a computing device may be considered to allow dynamic text processing capabilities.

It should be noted that conception of the present subject matter resulted from recognition of certain limitations associated with computing systems that allow users to both access password-protected systems and to engage in chat-window communication with friends and/or colleagues. For example, it was observed that in windowed operating systems a given window that has "focus" is the window that accepts text input. It was further observed that focus for a window may be intentionally selected by a user by cursor-based selection of or by tabbing to the given window. However, it was also observed that a system dialog or a chat message coming into a computing system may also cause the focus to change within the windowed operating system. It was further observed that in the case of an incoming chat message, a chat window may obtain/grab focus to display the incoming chat message and text entry for the computing system may be positioned into a text field entry area of a response to the chat message of the chat window. As a result, it was determined that, during normal use of a computing system, a user may become confused as to which window has focus as a result of a system dialog appearing, a chat window grabbing focus, or the user returning to the computer after a distraction. It was further observed that security systems require that users enter passwords to gain access to data and that many systems "remember" the user identity, thereby requiring that the user only enter their secret password to gain access to the data. It was further determined that this combination of factors leads to the accidental entering of the user's password into chat windows. However, it was also observed that there may be times when a user wishes to communicate a password to another person, such as a shared password to be used by a team of colleagues that are working on a project together. As such, it was determined that technology to prevent unintentional password entry within a chat window should not be prohibitive of entry of a password if the password is embedded within a text string (e.g., "The password for the project directory is ProjPasswd.") and the text string is entered within a configured time period that suggests the user is actively typing a chat message within the chat window. The present subject matter improves password protection by providing for prevention of accidental password disclosure in chat windows, while determining whether entry of the password is intentional and allowing transmission of the password if intentional entry of the password is detected, as described above and in more detail below. As such, improved password security may be obtained through use of the present technology.

The prevention of accidental password disclosure in application windows described herein may be performed in real time to allow prompt detection of password entry into inter-user communication applications. For purposes of the present description, real time shall include any time frame of sufficiently short duration as to provide reasonable response time for information processing acceptable to a user of the subject matter described. Additionally, the term "real time" shall include what is commonly termed "near real time" generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for prevention of accidental password disclosure in application windows. A computing device_1 102 through a computing device_N 104 communicate via a network 106 with several other devices. The other devices include a server_1 108 through a server_M 110.

As will be described in more detail below in association with FIG. 2 through FIG. 4C, the computing device_1 102 through the computing device_N 104 and/or the server_1 108 through a server_M 110 may each provide automated prevention of accidental password disclosure in application windows, as appropriate for a given implementation. The automated prevention of accidental password disclosure in application windows is based upon evaluation of text entry context information associated with text entry within an inter-user communication application. As described above and in more detail below, the text entry context information may include password entry detection criteria, such as run-time text analysis and time measurement/text-entry context analysis associated with text entry, as appropriate for a given implementation. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
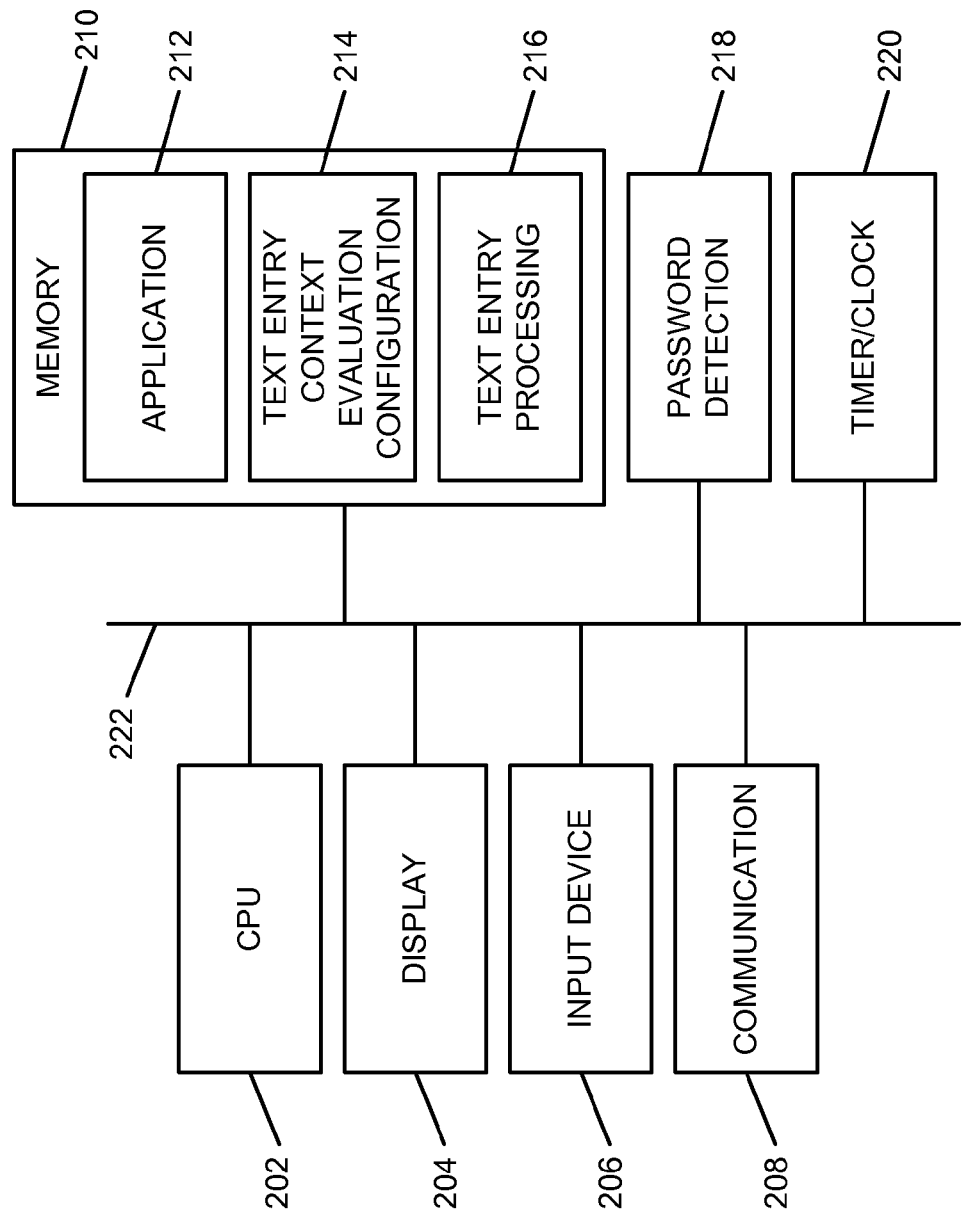
FIG. 2 is a block diagram of an example of an implementation of a core processing module capable of preventing accidental password disclosure in application windows according to an embodiment of the present subject matter.

FIG. 2 is a block diagram of an example of an implementation of a core processing module 200 capable of preventing accidental password disclosure in application windows. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of text entry context information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, such as where the present technology is implemented on a server device (e.g., the server_1 108 through the server_M 110). Accordingly, in such an implementation, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application area 212. The application area 212 stores and provides execution space for one or more applications, such as inter-user communications applications (e.g., chat applications, texting applications, etc.) for use in association with the core processing module 200.

The memory 210 also includes a text entry context evaluation configuration area 214 that stores configured text entry context evaluation information usable to evaluate text entry. As described above and in more detail below, criteria useable to evaluate text entry context may include password entry detection criteria/constraints, such as run-time text analysis criteria and time measurement/text-entry context analysis criteria usable to evaluate text entry.

The memory 210 additionally includes a text entry processing area 216. The text entry processing area 216 may be used to process text entered in association with an inter-user communication application to determine whether the text may include a password inadvertently entered by the user prior to transmitting text/potential password to another user.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A password detection module 218 is also illustrated. The password detection module 218 provides analytical text processing capabilities for the core processing module 200, as described above and in more detail below. The password detection module 218 implements the automated prevention of accidental password disclosure in application windows of the core processing module 200.

It should also be noted that the password detection module 218 may form a portion of other circuitry described without departure from the scope of the present subject matter. Further, the password detection module 218 may alternatively be implemented as an application stored within the memory 210.

In such an implementation, the password detection module 218 may include instructions executed by the CPU 202 for performing the functionality described herein. The CPU 202 may execute these instructions to provide the processing capabilities described above and in more detail below for the core processing module 200. The password detection module 218 may form a portion of an interrupt service routine (ISR), a portion of an operating system, a portion of a browser application, or a portion of a separate application without departure from the scope of the present subject matter.

A timer/clock module 220 is illustrated and used to determine timing and date information, such as time information associated with text entry for use in time measurement/text-entry context analysis, as described above and in more detail below. As such, the password detection module 218 may utilize information derived from the timer/clock module 220 for information processing activities, such as the prevention of accidental password disclosure in application windows described herein.

The CPU 202, the display 204, the input device 206, the communication module 208, the memory 210, the password detection module 218, and the timer/clock module 220 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
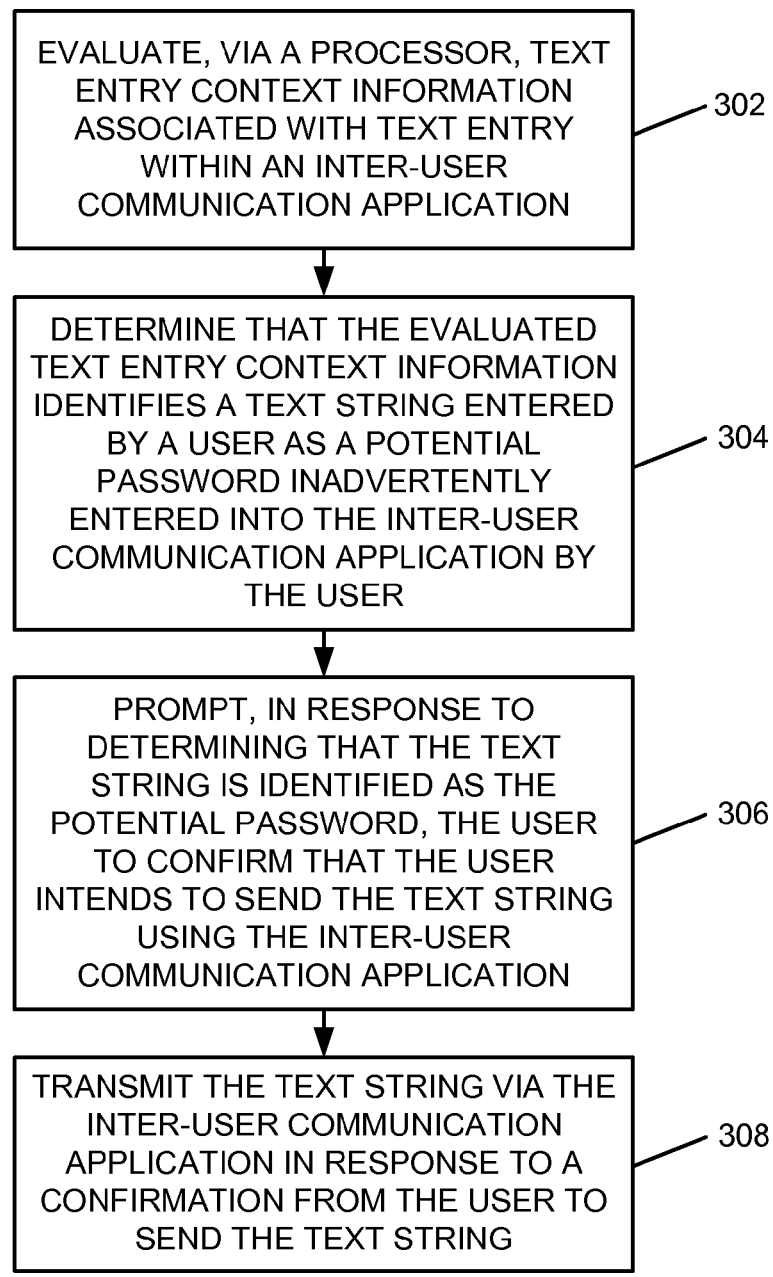
FIG. 3 is a flow chart of an example of an implementation of a process for prevention of accidental password disclosure in application windows according to an embodiment of the present subject matter.
Figure 4A:
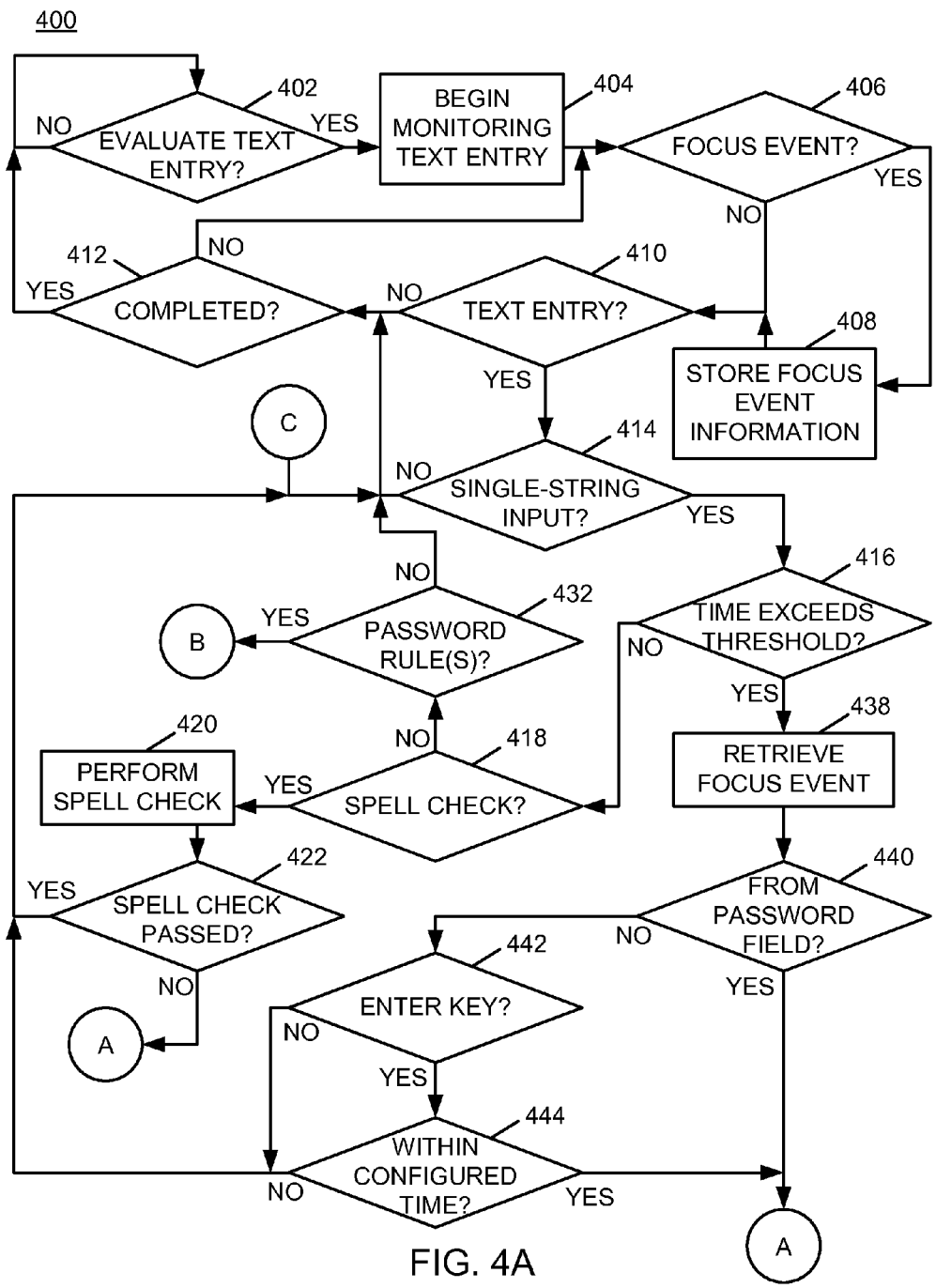
FIG. 4A is a flow chart of an example of an implementation of initial processing within a process for automated prevention of accidental password disclosure in application windows according to an embodiment of the present subject matter.
Figure 4B:
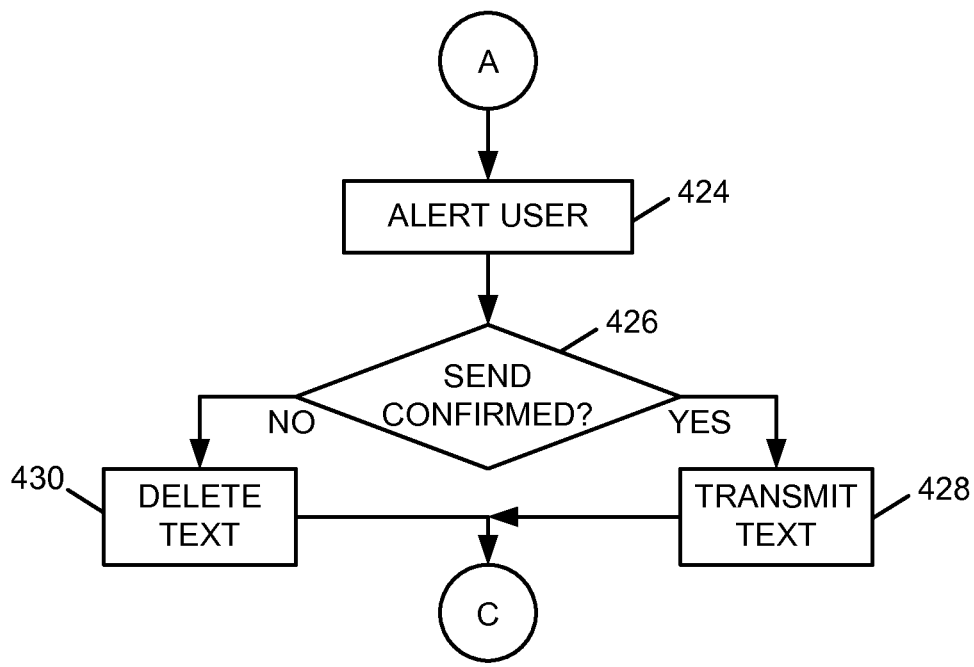
FIG. 4B is a flow chart of an example of an implementation of additional processing within a process for automated prevention of accidental password disclosure in application windows according to an embodiment of the present subject matter.
Figure 4C:
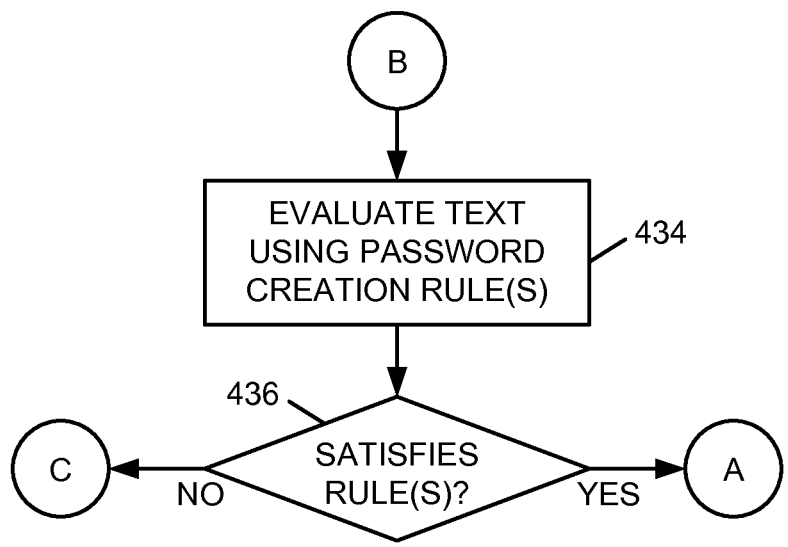
FIG. 4C is a flow chart of an example of an implementation of additional processing within a process for automated prevention of accidental password disclosure in application windows according to an embodiment of the present subject matter.

FIG. 3 through FIG. 4C described below represent example processes that may be executed by devices, such as the core processing module 200, to perform the prevention of accidental password disclosure in application windows associated with the present subject matter. Many other variations on the example processes are possible and all are considered within the scope of the present subject matter. The example processes may be performed by modules, such as the password detection module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for prevention of accidental password disclosure in application windows. At block 302, the process 300 evaluates, via a processor, text entry context information associated with text entry within an inter-user communication application. At block 304, the process 300 determines that the evaluated text entry context information identifies a text string entered by a user as a potential password inadvertently entered into the inter-user communication application by the user. At block 306, the process 300 prompts, in response to determining that the text string is identified as the potential password, the user to confirm that the user intends to send the text string using the inter-user communication application. At block 308, the process 300 transmits the text string via the inter-user communication application in response to a confirmation from the user to send the text string.

FIGS. 4A-4C illustrate a flow chart of an example of an implementation of process 400 for automated prevention of accidental password disclosure in application windows. FIG. 4A illustrates initial processing within the process 400. At decision point 402, the process 400 makes a determination as to whether a request to begin evaluation of text entry associated with one or more applications, such as inter-user communication applications, has been detected. A request to begin evaluation of text entry associated with one or more inter-user communication applications may be detected, for example, in response to a user selection to enable text evaluation either at a system level or application level of an inter-user communication application.

In response to determining that a request to begin evaluation of text entry associated with one or more applications, such as inter-user communication applications, has been detected, the process 400 begins monitoring text entry associated with the designated application(s) at block 404. As described above, text entry context information may be evaluated to determine whether a password may have been inadvertently entered by a user. A password may be inadvertently entered by a user such as in response to a windowing system focus change, of which the user is unaware, from one application to another inter-user communication application. Alternatively, a password may be inadvertently entered by a user when returning from a break or lunch time period if the user thinks the computer is locked (e.g., a screen saver, or other situation where password entry is required to access the computer), where the computer has instead actually had the focus changed to an inter-user communication application. Many other situations exist where a user may inadvertently enter a password into a non-password entry field or into an application into which the user does not intend to enter the password, and the present technology applies to any such situation.

At decision point 406, the process 400 makes a determination as to whether a windowing system focus change has occurred, such as to an inter-user communication application. In response to determining that a windowing system focus change has occurred, the process 400 stores focus event information associated with the windowing system focus change at block 408. The focus event information may be used to evaluate text entry context associated with text entry by the user, as described above and in more detail below. The stored focus event information may include a focus change time measurement, such as a time obtained from the timer/clock module 220. The stored focus event information may also include a focus change source application identifier and a focus change target application identifier. The focus change target application identifier may be used to identify inter-user communication applications within a given system. The stored focus event information may additionally include an indication of whether the source application represented by the source application identifier was focused within a password field of the source application prior to the detected focus change. As such, the process 400 may further detect focus changes, such as in response to an incoming chat message that changes focus to a chat application, from a password entry field of a user application that does utilize a password for application/data access by the user.

In response to storing the focus event information at block 408 or in response to determining that a windowing system focus change has not occurred at decision point 406, the process 400 makes a determination at decision point 410 as to whether text entry has been detected. In response to determining that text entry has not been detected at decision point 410, the process 400 makes a determination at decision point 412 as to whether evaluation of text entry has been completed, such as by a user selection to disable the evaluation of text entry in association with one or more applications. In response to determining that evaluation of text entry has been completed, the process 400 returns to decision point 402 and iterates as described above. In response to determining that evaluation of text entry has not been completed, the process 400 returns to decision point 406 and iterates as described above.

Returning to the description of decision point 410, in response to determining that text entry has been detected, either in association with or not in association with a detected focus event, the process 400 makes a determination at decision point 414 as to whether the detected text entry is single-string input (e.g., a single sequence of characters un-delineated by a space, carriage return, etc.). The term "single-string input" may alternatively be referred to as a "single-string text entry" herein.

In response to determining that the detected text entry is not single-string input (e.g., is a multiple word entry or a multi-line entry) at decision point 414, the process 400 returns to decision point 412 and iterates as described above. As such, the process 400 filters entries, such as a multiple word entries, multi-line entries, and other forms of entries from the text context evaluation described below.

In response to determining that the detected text entry is single-string input at decision point 414, the process 400 makes a determination at decision point 416 as to whether a time since a last text entry is greater than or equal to a configured text evaluation threshold of time. For example, a configured "time since last entry" threshold (e.g., an idle terminal time threshold) or a configured "window focus recently acquired" threshold may be evaluated. The configured text evaluation threshold of time may be used to determine whether a user has stepped away from the computing device, such as for a break or for lunch. In such a situation, where a chat window has been idle for a configured amount of time (e.g., a configured idle terminal time threshold of thirty (30) seconds or more), an unexpected text entry of a text string may be a result of a user returning from coffee break or other out-of-office event. As such, where an idle terminal time threshold delay from a window system focus change occurs followed by a user entry of a single-string input and a transmission instruction (e.g., an enter key) within a configured muscle reflex response time of the single-string input entry, the user may have inadvertently entered a password into an inter-user communication application, such as a chat window. Alternatively, if a window has very recently been given focus (e.g., last two (2) seconds), then it is possible that a password text entry is in error. The configured text evaluation threshold of time may also be used to measure typing cadence associated with focus changes, such as when a chat message arrives and causes a focus change from another application. As such, many options for use of one or more configured text evaluation time thresholds may be implemented, and all such options are represented by the processing described in association with the process 400. A description of processing responsive to an affirmative determination at decision point 416 will be deferred and described further below.

As such, in response to determining at decision point 416 that a time since a last text entry is not greater than or equal to a configured text evaluation threshold of time, the process 400 makes a determination at decision point 418 as to whether to perform a spell check on the detected single-string text entry. A description of processing responsive to a negative determination at decision point 418 will be deferred and described further below.

In response to determining to perform a spell check on the detected single-string text entry, the process 400 performs a spell check on the single-string text entry at block 420. At decision point 422, the process 400 makes a determination as to whether the spell check passed. A determination that the spell check failed may be utilized to identify the text string as the potential password inadvertently entered into the inter-user communication application by the user.

In response to determining that the spell check has passed, the process 400 returns to decision point 412 and iterates as described above. In response to determining that the spell check has not passed (e.g., has failed), the process 400 transitions to the processing shown and described in association with FIG. 4B.

FIG. 4B illustrates additional processing associated with the process 400 for automated prevention of accidental password disclosure in application windows. At block 424, the process 400 alerts the user that the user intends to send a potential password using the inter-user communication application. For example, the process 400 may prompt the user in response to determining, using text entry context information analysis, that the text string is identified as a potential password, to confirm the transmission, and to allow the user to prevent inadvertent transmission of the password to an unintended recipient. Within the present portion of the description, the process 400 may further alert the user that the text entry failed the spell check and may identify the potential password to the user.

At decision point 426 makes a determination as to whether a user confirmation to send the single text string has been detected. In response to detecting the user confirmation to send the single text string, the process 400 transmits the text via the inter-user communication application at block 428. In response to detecting that the user did not confirm sending the single text string (e.g., responded negatively to the prompt), the process 400 deletes the text from the inter-user communication application at block 430. As such, the process 400 may prevent inadvertent transmission of the password to an unintended recipient using text entry context information analysis.

In response to either transmitting the text via the inter-user communication application at block 428 or deleting the text from the inter-user communication application at block 430, the process 400 returns to the processing described in association with FIG. 4A at decision point 412 to determine whether evaluation of text entry has been completed and iterates as described above.

Returning to the description of decision point 418 within FIG. 4A, in response to determining not to perform a spell check on the detected single-string text entry, the process 400 makes a determination at decision point 432 as to whether to apply one or more system-level or application-level password creation rules to the detected single-string text entry. In response to determining not to apply one or more system-level or application-level password creation rules to the detected single-string text entry, the process 400 returns to decision point 412 and iterates as described above.

In response to determining to apply one or more system-level or application-level password creation rules to the detected single-string text entry at decision point 432, the process 400 transitions to the processing shown and described in association with FIG. 4C.

FIG. 4C illustrates additional processing associated with the process 400 for automated prevention of accidental password disclosure in application windows. At block 434, the process 400 evaluates the single-string text entry using one or more password creation rules that specify password creation requirements. At decision point 436, the process 400 determines whether the single-string text entry satisfies the password creation requirements of the applied password creation rule(s). For example, password creation rules may prevent entry of dictionary words, and may require certain combinations of upper/lower case alphabetic characters, special characters, and numerals. As such, applying password creation rules to detected single-string text entries may be used to identify potential passwords inadvertently entered by a user into an inter-user communication application.

In response to determining that the single-string text entry satisfies the password creation requirements of the applied password creation rule(s) at decision point 436, the process 400 returns to the processing described in association with FIG. 4B at block 424 to alert the user of the potential password identified using the password creation rule(s), and iterates as described above. In response to determining that the single-string text entry does not satisfy the password creation requirements of the applied password creation rule(s) at decision point 436, the process 400 returns to the processing described in association with FIG. 4A at block 412 and iterates as described above.

Returning now to the description of decision point 416 within FIG. 4A, as described above, the configured text evaluation threshold of time may be used to determine whether a user has stepped away from the computing device, such as for a break or for lunch (e.g., a configured idle terminal time threshold). The configured text evaluation threshold of time may also be used to measure typing cadence associated with focus changes, such as when a chat message arrives and causes a focus change from another application.

In response to determining at decision point 416 that a time since a last text entry is greater than or equal to a configured text evaluation threshold of time, the process 400 retrieves stored focus event information at block 438. At decision point 440, the process 400 makes a determination as to whether a windowing system focus change to the inter-user communication application has been detected from a different application in which a valid password entry field was in focus. The determination at decision point 440 may be performed, for example, using source application information within the stored focus event information, as described above. As such, the process 400 may detect entry of a single text string without spaces within a configured time from the focus change from the valid password entry field of the different application to the inter-user communication application, such as a chat application.

In response to determining at decision point 440 that a windowing system focus change to the inter-user communication application has been detected from a different application in which a valid password entry field was in focus, the process 400 transitions to the processing described above in association with FIG. 4B at block 424 to alert the user of the potential password entry into the inter-user communication application and iterates as described above.

In response to determining at decision point 440 that a windowing system focus change to the inter-user communication application has not been detected from a different application in which a valid password entry field was in focus, the process 400 makes a determination at decision point 442 as to whether an entered transmission instruction that is configured to cause transmission of text inputs via the inter-user communication application has been detected (e.g., the "enter" key). An enter key is but one example of a user entered transmission instruction that is configured to cause transmission of text inputs via the inter-user communication application. Other possible instruction mechanisms are possible and all are considered within the scope of the present technology. Such processing may be performed to determine whether a single-string entry is the result of muscle reflex.

In response to determining that an entered transmission instruction that is configured to cause transmission of text inputs via the inter-user communication application has not been detected, the process 400 returns to decision point 412 and iterates as described above. In response to determining that an entered transmission instruction that is configured to cause transmission of text inputs via the inter-user communication application has been detected, the process 400 makes a determination at decision point 444 as to whether the detected entered transmission instruction was detected within a configured muscle reflex time from the entry of the single-string text entry. Such processing again may be performed to detect entry of a possible password followed by a muscle reflex entry of a transmit instruction within an inter-user communication application.

In response to determining that the detected entered transmission instruction was not detected within a configured muscle reflex time from the entry of the single-string text entry at decision point 444, the process 400 returns to decision point 412 and iterates as described above. In response to determining that the detected entered transmission instruction was detected within a configured muscle reflex time from the entry of the single-string text entry at decision point 444, the process 400 returns to the processing described in association with FIG. 4B at block 424 to alert the user of a pending transmission of an identified potential password using the inter-user communication application. As such, the process 400 may also detect and process typing cadence as part of the text entry context information evaluation. Many other possibilities exist for cadence evaluation in association with prevention of accidental password disclosure in application windows and all such possibilities are considered within the scope of the present subject matter.

As such, the process 400 may be enabled and disabled by a user to evaluate text entry context information associated with text entry within an inter-user communication application. The process 400 utilizes a variety of techniques to determine and evaluate whether text entry context information identifies a text string entered by a user as a potential password that has been inadvertently entered into an inter-user communication application by the user. For example, the process 400 utilizes spell checking, password creation rule applications, and time-based text evaluation criteria in association with focus events to detect potential inadvertent password entry into an inter-user communication application. The process 400 filters multiple word and multiple line input streams from the processing to improve analytical efficiency.

As described above in association with FIG. 1 through FIG. 4C, the example systems and processes provide for prevention of accidental password disclosure in application windows. Many other variations and additional activities associated with prevention of accidental password disclosure in application windows are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
evaluating, via a processor without use of any configured password, text entry context information associated with text entry within an inter-user communication application;
determining that the evaluated text entry context information identifies a text string entered by a user as a potential password inadvertently entered into the inter-user communication application by the user;
prompting, in response to determining that the text string is identified as the potential password, the user to confirm that the user intends to send the text string using the inter-user communication application; and
transmitting the text string via the inter-user communication application in response to a confirmation from the user to send the text string.

2. The method of claim 1, where:
the text entry context information comprises at least one of run-time text-based and run-time time-based analysis of a manner of entry and content of characters of the text entry that omits evaluation of known passwords; and
evaluating, via the processor without the use of any configured password, the text entry context information associated with the text entry within the inter-user communication application comprises:
determining whether the text entry comprises a single-string input; and
determining, in response to determining that the text entry comprises the single-string input, whether a time since a last text entry is greater than or equal to a configured text evaluation threshold of time.

3. The method of claim 2, where:
determining that the evaluated text entry context information identifies the text string entered by the user as the potential password inadvertently entered into the inter-user communication application by the user comprises:
performing, in response to determining that the text entry comprises the single-string input, a spell check on the text entry; and
determining that the spell check failed.

4. The method of claim 3, where:
prompting, in response to determining that the text string is identified as the potential password, the user to confirm that the user intends to send the text string using the inter-user communication application comprises:
alerting, in response to determining that the spell check failed, the user that the text entry failed the spell check; and
identifying the potential password.

5. The method of claim 1, where:
the text entry context information comprises at least one of run-time text-based and run-time time-based analysis of a manner of entry and content of characters of the text entry that omits evaluation of known passwords;
evaluating, via the processor without the use of any configured password, the text entry context information associated with the text entry within the inter-user communication application comprises:
evaluating the text entry using a password creation rule that specifies password creation requirements; and
determining that the evaluated text entry context information identifies the text string entered by the user as the potential password inadvertently entered into the inter-user communication application by the user comprises:
determining that the text string satisfies the password creation requirements of the password creation rule.

6. The method of claim 1, where:
the text entry context information comprises at least one of run-time text-based and run-time time-based analysis of a manner of entry and content of characters of the text entry that omits evaluation of known passwords;
evaluating, via the processor without the use of any configured password, the text entry context information associated with the text entry within the inter-user communication application comprises:
detecting a windowing system focus change to the inter-user communication application; and
determining whether an input typing delay greater than a configured idle terminal time threshold from the windowing system focus change occurred prior to entry of the text string; and
determining that the evaluated text entry context information identifies the text string entered by the user as the potential password inadvertently entered into the inter-user communication application by the user comprises:
determining that the input typing delay greater than the configured idle terminal time threshold from the windowing system focus change occurred prior to the entry of the text string;
determining that the user entered a single-string input followed by a transmission instruction within a configured muscle reflex response time of the single-string input entry, where the transmission instruction causes transmission of text inputs via the inter-user communication application; and
identifying the text entry as the potential password.

7. The method of claim 1, where:
the text entry context information comprises at least one of run-time text-based and run-time time-based analysis of a manner of entry and content of characters of the text entry that omits evaluation of known passwords;
evaluating, via the processor without the use of any configured password, the text entry context information associated with the text entry within the inter-user communication application comprises:
detecting a windowing system focus change from a valid password entry field of a different application to the inter-user communication application; and
detecting entry of a single text string without spaces within a configured time from the focus change from the valid password entry field of the different application to the inter-user communication application; and
determining that the evaluated text entry context information identifies the text string entered by the user as the potential password inadvertently entered into the inter-user communication application by the user comprises:
identifying the single text string without spaces as the potential password in response to detecting the entry of the single text string without spaces within the configured time from the focus change from the valid password entry field of the different application to the inter-user communication application.

8. A system, comprising:
a communication module; and
a processor device programmed to:
evaluate, without use of any configured password, text entry context information associated with text entry within an inter-user communication application;
determine that the evaluated text entry context information identifies a text string entered by a user as a potential password inadvertently entered into the inter-user communication application by the user;

prompt, in response to determining that the text string is identified as the potential password, the user to confirm that the user intends to send the text string using the inter-user communication application; and
transmit the text string via the inter-user communication application using the communication module in response to a confirmation from the user to send the text string.

9. The system of claim 8, where:
the text entry context information comprises at least one of run-time text-based and run-time time-based analysis of a manner of entry and content of characters of the text entry that omits evaluation of known passwords; and
in being programmed to evaluate, without the use of any configured password, the text entry context information associated with the text entry within the inter-user communication application, the processor device is programmed to:
determine whether the text entry comprises a single-string input; and
determine, in response to determining that the text entry comprises the single-string input, whether a time since a last text entry is greater than or equal to a configured text evaluation threshold of time.

10. The system of claim 9, where:
in being programmed to determine that the evaluated text entry context information identifies the text string entered by the user as the potential password inadvertently entered into the inter-user communication application by the user, the processor device is programmed to:
perform, in response to determining that the text entry comprises the single-string input, a spell check on the text entry; and
determine that the spell check failed; and
in being programmed to prompt, in response to determining that the text string is identified as the potential password, the user to confirm that the user intends to send the text string using the inter-user communication application, the processor device is programmed to:
alert, in response to determining that the spell check failed, the user that the text entry failed the spell check; and
identify the potential password.

11. The system of claim 8, where:
the text entry context information comprises at least one of run-time text-based and run-time time-based analysis of a manner of entry and content of characters of the text entry that omits evaluation of known passwords;
in being programmed to evaluate, without the use of any configured password, the text entry context information associated with the text entry within the inter-user communication application, the processor device is programmed to:
evaluate the text entry using a password creation rule that specifies password creation requirements; and
in being programmed to determine that the evaluated text entry context information identifies the text string entered by the user as the potential password inadvertently entered into the inter-user communication application by the user, the processor device is programmed to:
determine that the text string satisfies the password creation requirements of the password creation rule.

12. The system of claim 8, where:
the text entry context information comprises at least one of run-time text-based and run-time time-based analysis of a manner of entry and content of characters of the text entry that omits evaluation of known passwords;
in being programmed to evaluate, without the use of any configured password, the text entry context information associated with the text entry within the inter-user communication application, the processor device is programmed to:
detect a windowing system focus change to the inter-user communication application; and
determine whether an input typing delay greater than a configured idle terminal time threshold from the windowing system focus change occurred prior to entry of the text string; and
in being programmed to determine that the evaluated text entry context information identifies the text string entered by the user as the potential password inadvertently entered into the inter-user communication application by the user, the processor device is programmed to:
determine that the input typing delay greater than the configured idle terminal time threshold from the windowing system focus change occurred prior to the entry of the text string;
determine that the user entered a single-string input followed by a transmission instruction within a configured muscle reflex response time of the single-string input entry, where the transmission instruction causes transmission of text inputs via the inter-user communication application; and
identify the text entry as the potential password.

13. The system of claim 8, where:
the text entry context information comprises at least one of run-time text-based and run-time time-based analysis of a manner of entry and content of characters of the text entry that omits evaluation of known passwords;
in being programmed to evaluate, without the use of any configured password, the text entry context information associated with the text entry within the inter-user communication application, the processor device is programmed to:
detect a windowing system focus change from a valid password entry field of a different application to the inter-user communication application; and
detect entry of a single text string without spaces within a configured time from the focus change from the valid password entry field of the different application to the inter-user communication application; and
in being programmed to determine that the evaluated text entry context information identifies the text string entered by the user as the potential password inadvertently entered into the inter-user communication application by the user, the processor device is programmed to:
identify the single text string without spaces as the potential password in response to detecting the entry of the single text string without spaces within the configured time from the focus change from the valid password entry field of the different application to the inter-user communication application.

14. A computer program product, comprising:
a computer readable storage device having computer readable program code embodied therewith, where the computer readable program code when executed on a computer causes the computer to:
evaluate, without use of any configured password, text entry context information associated with text entry within an inter-user communication application;

determine that the evaluated text entry context information identifies a text string entered by a user as a potential password inadvertently entered into the inter-user communication application by the user;

prompt, in response to determining that the text string is identified as the potential password, the user to confirm that the user intends to send the text string using the inter-user communication application; and transmit the text string via the inter-user communication application in response to a confirmation from the user to send the text string.

15. The computer program product of claim 14, where:

the text entry context information comprises at least one of run-time text-based and run-time time-based analysis of a manner of entry and content of characters of the text entry that omits evaluation of known passwords; and in causing the computer to evaluate, without the use of any configured password, the text entry context information associated with the text entry within the inter-user communication application, the computer readable program code when executed on the computer causes the computer to:

determine whether the text entry comprises a single-string input; and determine, in response to determining that the text entry comprises the single-string input, whether a time since a last text entry is greater than or equal to a configured text evaluation threshold of time.

16. The computer program product of claim 15, where:

in causing the computer to determine that the evaluated text entry context information identifies the text string entered by the user as the potential password inadvertently entered into the inter-user communication application by the user, the computer readable program code when executed on the computer causes the computer to:

perform, in response to determining that the text entry comprises the single-string input, a spell check on the text entry; and determine that the spell check failed.

17. The computer program product of claim 16, where:

in causing the computer to prompt, in response to determining that the text string is identified as the potential password, the user to confirm that the user intends to send the text string using the inter-user communication application, the computer readable program code when executed on the computer causes the computer to:

alert, in response to determining that the spell check failed, the user that the text entry failed the spell check; and identify the potential password.

18. The computer program product of claim 14, where:

the text entry context information comprises at least one of run-time text-based and run-time time-based analysis of a manner of entry and content of characters of the text entry that omits evaluation of known passwords;

in causing the computer to evaluate, without the use of any configured password, the text entry context information associated with the text entry within the inter-user communication application, the computer readable program code when executed on the computer causes the computer to:

evaluate the text entry using a password creation rule that specifies password creation requirements; and in causing the computer to determine that the evaluated text entry context information identifies the text string entered by the user as the potential password inadvertently entered into the inter-user communication application by the user, the computer readable program code when executed on the computer causes the computer to:

determine that the text string satisfies the password creation requirements of the password creation rule.

19. The computer program product of claim 14, where:

the text entry context information comprises at least one of run-time text-based and run-time time-based analysis of a manner of entry and content of characters of the text entry that omits evaluation of known passwords;

in causing the computer to evaluate, without the use of any configured password, the text entry context information associated with the text entry within the inter-user communication application, the computer readable program code when executed on the computer causes the computer to:

detect a windowing system focus change to the inter-user communication application; and determine whether an input typing delay greater than a configured idle terminal time threshold from the windowing system focus change occurred prior to entry of the text string; and in causing the computer to determine that the evaluated text entry context information identifies the text string entered by the user as the potential password inadvertently entered into the inter-user communication application by the user, the computer readable program code when executed on the computer causes the computer to:

determine that the input typing delay greater than the configured idle terminal time threshold from the windowing system focus change occurred prior to the entry of the text string;

determine that the user entered a single-string input followed by a transmission instruction within a configured muscle reflex response time of the single-string input entry, where the transmission instruction causes transmission of text inputs via the inter-user communication application; and identify the text entry as the potential password.

20. The computer program product of claim 14, where:

the text entry context information comprises at least one of run-time text-based and run-time time-based analysis of a manner of entry and content of characters of the text entry that omits evaluation of known passwords;

in causing the computer to evaluate, without the use of any configured password, the text entry context information associated with the text entry within the inter-user communication application, the computer readable program code when executed on the computer causes the computer to:

detect a windowing system focus change from a valid password entry field of a different application to the inter-user communication application; and detect entry of a single text string without spaces within a configured time from the focus change from the valid password entry field of the different application to the inter-user communication application; and in causing the computer to determine that the evaluated text entry context information identifies the text string entered by the user as the potential password inadvertently entered into the inter-user communication application by the user, the computer readable program code when executed on the computer causes the computer to:

identify the single text string without spaces as the potential password in response to detecting the entry of the single text string without spaces within the configured time from the focus change from the valid password entry field of the different application to the inter-user communication application.

* * * * *